(12) United States Patent
Fowler et al.

(10) Patent No.: US 10,174,228 B2
(45) Date of Patent: Jan. 8, 2019

(54) AMORPHOUS POLY ALPHA OLEFINS OF LOW ACID AND ORGANOLEPTIC PROPERTIES AND A PROCESS FOR PRODUCING SAME

(71) Applicants: Nick Fowler, Odessa, TX (US); Enrico Buenacosa, Odessa, TX (US); John Joseph DeCair, Odessa, TX (US); Steven Oetting, Odessa, TX (US); Andres Sustic, Odessa, TX (US)

(72) Inventors: Nick Fowler, Odessa, TX (US); Enrico Buenacosa, Odessa, TX (US); John Joseph DeCair, Odessa, TX (US); Steven Oetting, Odessa, TX (US); Andres Sustic, Odessa, TX (US)

( * ) Notice: Subject to any disclaimer, the term of this patent is extended or adjusted under 35 U.S.C. 154(b) by 0 days.

(21) Appl. No.: 16/108,631

(22) Filed: Aug. 22, 2018

(65) Prior Publication Data

US 2018/0355228 A1    Dec. 13, 2018

Related U.S. Application Data

(63) Continuation of application No. 15/486,115, filed on Apr. 12, 2017.

(60) Provisional application No. 62/321,663, filed on Apr. 12, 2016, provisional application No. 62/558,709, filed on Sep. 14, 2017.

(51) Int. Cl.
*C09J 123/14*       (2006.01)
*C08J 3/00*         (2006.01)

(52) U.S. Cl.
CPC .............. *C09J 123/14* (2013.01); *C08J 3/00* (2013.01)

(58) Field of Classification Search
USPC .................................................. 523/309, 328
See application file for complete search history.

(56) References Cited

U.S. PATENT DOCUMENTS

| | | | | | |
|---|---|---|---|---|---|
| 3,156,641 | A | * | 11/1964 | Seelig | B01J 23/888 208/109 |
| 3,296,240 | A | * | 1/1967 | MacDonald | C08F 6/12 159/13.2 |
| 3,437,645 | A | * | 4/1969 | Paige | C08C 2/06 159/48.1 |
| 3,903,066 | A | * | 9/1975 | Rohde | C08F 6/02 528/497 |
| 4,156,075 | A | * | 5/1979 | Holliday | C08F 6/02 528/483 |
| 4,710,563 | A | * | 12/1987 | Oetting | C08F 6/28 526/68 |
| 5,948,447 | A | * | 9/1999 | McHaney | C08F 6/001 425/171 |
| 2009/0239999 | A1 | * | 9/2009 | Canich | C08F 10/06 525/55 |

* cited by examiner

*Primary Examiner* — Tae H Yoon

(74) *Attorney, Agent, or Firm* — Buskop Law Group, P.C.; Wendy Buskop

(57) ABSTRACT

A process for reducing unreacted monomers and condensable and non-condensable hydrocarbon fractions in an APAO which includes introducing molten APAO into heated and insulated jacketed pipe while injecting a stripping agent based on the total weight of the contents of the jacketed pipe; maintaining the stripping agent with the molten APAO stream from ten seconds to ten minutes, forming a flowable heated mixture at 250 to 450 degrees Fahrenheit in the heated and jacketed pipe forming a flowing heated mixture; and passing the flowing heated mixture through a thin film evaporator assembly, while maintaining the temperature of the flowing heated mixture, stripping the organoleptic species and acids and volatile organic components from the flowing heated mixture and removing and recovering a condensable fuel fraction and a non-condensable hydrocarbon gas with energy, while simultaneously forming an odor-reduced, cleaned molten APAO-based HMA.

10 Claims, No Drawings

AMORPHOUS POLY ALPHA OLEFINS OF LOW ACID AND ORGANOLEPTIC PROPERTIES AND A PROCESS FOR PRODUCING SAME

CROSS-REFERENCE TO RELATED APPLICATIONS

The present application claims priority to U.S. Provisional Application No. 62/558,709 filed Sep. 14, 2017, for "Amorphous Poly Alpha Olefins of Low Acid and Organoleptic Properties and a Process for Producing the Same"; and is a continuation of U.S. patent Ser. No. 15/486,115 filed Apr. 12, 2017, for "Hexene-1 Containing Amorphous Polyalphaolefins for Improved Hot Melt Adhesives", which claims priority to U.S. Provisional Patent Application Ser. No. 62/321,663, filed on Apr. 12, 2016 for "Hexene-1 Containing Amorphous Polyalphaolefins for Improved Hot Melt Adhesives". These references are hereby incorporated in their entirety.

FIELD

The present invention relates to processes for the production of purified amorphous polymers, with reduced organoleptic and acidic properties, from crude or reaction product mixtures. The present invention further relates to the use of purified amorphous polymers in hot melt adhesive compositions.

BACKGROUND

Hot melt adhesives (HMAs) are a form of thermoplastic adhesive that is designed to be applied in the molten state. The glue is tacky when hot and solidifies in a few seconds to about one minute. HMAs may also be applied by dipping or spraying.

In industrial use, HMAs provide several advantages over solvent-based adhesives. Volatile organic compounds are reduced or eliminated, and the drying or curing step is eliminated. HMAs have a long shelf-life and usually may be disposed of without special precautions. Some of the disadvantages include thermal load of the substrate, limiting use to substrates not sensitive to higher temperatures, and loss of bond strength at higher temperatures, up to complete melting of the adhesive. These may be mitigated by using a reactive adhesive that, after solidifying, undergoes further curing, for example, by moisture (e.g., reactive urethanes and silicones) or with ultraviolet radiation. Additionally, some HMAs may not be resistant to chemical attacks and weathering, and HMAs do not lose thickness during solidifying, while solvent-based adhesives may lose up to 50-70% of layer thickness during drying.

HMAs formulations of the prior art include styrene block copolymer (SBC, aka rubber) based formulations, acrylic-based (acrylics) formulations, silicone-based formulations, and metallocene polyethylene- and metallocene polypropylene-based formulations.

Amorphous poly alpha olefin (APAO) polymers are compatible with many plasticizers, tackifiers, waxes, and polymers; they find wide use in many adhesive applications. APAO HMAs have good acid resistance, moderate heat resistance, and light and UV resistance due to their saturated hydrocarbon nature; are tacky, soft, and flexible; and have good adhesion to multiple substrates and longer open times than crystalline polyolefins. APAOs tend to have lower melt viscosity, better adhesion, longer open times, and slower set times than comparable ethylene vinyl acetate (EVA) copolymers. Some APAOs may be used alone, but they are often compounded with co-adjuvants such as tackifiers, waxes, and plasticizers (e.g., mineral oil, polybutylene oil, naphthenic oil). Examples of APAOs include amorphous (also known as atactic) propylene (APP, CAS #9003-07-0), amorphous propylene/ethylene (APE, CAS #9010-79-1), amorphous propylene/butene-1 (APB, CAS #29160-13-2), amorphous propylene/hexene-1 (APH, CAS #25895-44-7) copolymers, and amorphous propylene/ethylene/butene-1 (APEB, CAS #25895-47-0) and amorphous propylene/butene-1/hexene-1 (APBH) terpolymers. APP is harder than APE, which is generally harder than APB, which is generally harder than APH, in accordance with decreasing crystallinity. And in accordance with their decreasing crystallinity, APP has higher tensile or mechanical strength than APE, which has generally higher tensile or mechanical strength than APB, which has generally higher tensile or mechanical strength than APH. Due to their lower molecular weights as compared to other polymers such as SBCs, acrylics, or many metallocene polyethylenes and polypropylenes, at typical application temperatures of 375 degrees Fahrenheit, APAOs exhibit a high degree of substrate wetting, which is a very desirable HMA property. However, APAOs show relatively low cohesion, as the entangled polymer chains have a fairly high degree of freedom of movement. Under mechanical load, most of the strain is dissipated by elongation and disentanglement of polymer chains, and only a small fraction reaches the adhesive-substrate interface. Cohesive failure rather than adhesive failure is therefore amore common failure mode of APAOs.

APAOs are produced by the (co-)polymerization of α-olefins, e.g. ethylene (CAS #74-85-1), propylene (CAS #115-07-1), butene-1 (CAS #106-98-9), or hexene-1 (CAS #592-41-6), with Ziegler-Natta catalysts. The (co-)polymers have an amorphous structure which makes them useful for the production of HMAs.

The present embodiments meet these needs.

DETAILED DESCRIPTION OF THE EMBODIMENTS

Before explaining the present apparatus in detail, it is to be understood that the apparatus is not limited to the particular embodiments and that it can be practiced or carried out in various ways.

Specific structural and functional details disclosed herein are not to be interpreted as limiting, but merely as a basis of the claims and as a representative basis for teaching persons having ordinary skill in the art to variously employ the present invention.

The following description of the embodiments is merely exemplary in nature and is in no way intended to limit the subject matter of the present disclosure, their application, or uses.

The embodiments relate to a process for reducing organoleptic and acidic species, including unreacted monomers and condensable and non-condensable hydrocarbon fractions, in amorphous poly alpha olefin.

The process includes introducing a molten mixture of amorphous poly alpha olefin into a heated and insulated jacketed pipe while injecting into the jacketed pipe from 0.1 wt % to 10 wt % of a stripping agent based on the total weight of the contents of the jacketed pipe at a temperature above the softening point of the molten amorphous poly alpha olefin, wherein the stripping agent is selected from the following group: liquid water, steam, and an inert gas.

The process includes maintaining the stripping agent with the molten amorphous polyalpha olefin from ten seconds to ten minutes at 250 degrees Fahrenheit to 450 degrees Fahrenheit in the heated and insulated jacketed pipe forming a flowing heated mixture The process includes passing the flowing heated mixture through a thin film evaporator assembly, while maintaining the temperature of the flowing heated mixture and stripping organoleptic species and acids and volatile organic components from the flowing heated mixture, removing and recovering condensable hydrocarbon fractions of diesel fuel, and evolving a non-condensable gas of stripping agent and odor causing monomer while simultaneously forming a 10% to 90% odor-reduced cleaned molten amorphous poly alpha olefin based hot melt adhesives.

The amorphous poly alpha olefin includes amorphous propylene, amorphous propylene/ethylene, amorphous propylene/butene-1, amorphous propylene/hexene-1 copolymers, and amorphous propylene/ethylene/butene-1 and amorphous propylene/butene-1/hexene-1 terpolymers.

The process further includes using a static mixer providing mixing prior to passing the heated mixture into the thin film evaporator.

The process further includes using a single or twin screw extruder providing mixing for forming an increased homogenous mixture prior to passing the heated mixture into the thin film evaporator.

The APAO is a terpolymer or a copolymer comprising a member of the group: hexene-1, propylene, ethylene, and butene-1.

The process further includes adding 0.1 wt % and 40 wt % of a co-adjuvant based on the final weight percent of the resultant hot melt adhesive to the polymer for forming a hot melt adhesive, then stripping the combination of polymer with co-adjuvant as the mixture is introduced to a mixing device, resulting in a 10% to 90% reduction of odor of the resultant hot melt adhesive.

The stripped acid, volatile organic compounds, and organoleptic species that are removed comprise one or more of the following: alkanes, alkenes, oligomers, volatile residues from a co-catalyst, and acids from chloride compounds.

The inert gas is nitrogen.

In embodiments, the molten material flows through the jacketed pipe at a rate of 500 to 10,000 pounds per hour.

Ranges are used throughout as shorthand for describing each and every value that is within the range. Any value within the range can be selected as the terminus of the range. Unless otherwise specified, all percentages and amounts expressed herein and elsewhere in the specification should be understood to refer to percentages by weight.

For the purposes of this specification and appended claims, unless otherwise indicated, all numbers expressing quantities, percentages or proportions, and other numerical values are to be understood as being modified in all instances by the term "about". The use of the term "about" applies to all numerical values, whether or not explicitly indicated. This term generally refers to a range of numbers that one of ordinary skill in the art would consider as a reasonable amount of deviation to the recited numerical values (i.e., having the equivalent function or result). For example, this term can be construed as including a deviation of ±10 percent, ±5 percent, or ±1 percent of the given numerical value, provided such a deviation does not alter the end function or result of be value. Accordingly, unless indicated to the contrary, the numerical parameters set forth in this specification and attached claims are approximations that can vary depending upon the desired properties sought to be obtained by the present invention.

It is noted that, as used in this specification and the appended claims, the singular forms "a," "an," and "the" include plural references unless expressly and unequivocally limited to one referent. As used herein, the term "include" and its grammatical variants are intended to be non-limiting, such that recitation of items in a list is not to the exclusion of other like items that can be substituted or added to the listed items. For example, as used in this specification and the following claims, the terms "comprise" (as well as forms, derivatives, or variations thereof, such as "comprising" and "comprises"), "include" (as well as forms, derivatives, or variations thereof, such as "including" and "includes") and "has" (as well as forms, derivatives, or variations thereof, such as "having" and "have") are inclusive (i.e., open-ended) and do not exclude additional elements or steps. Accordingly, these terms are intended to not only cover the recited element(s) or step(s), but may also include other elements or steps not expressly recited. Furthermore, as used herein, the use of the terms "a" or "an" when used in conjunction with an element may mean "one," but is also consistent with the meaning of "one or more," "at least one," and "one or more than one." Therefore, an element preceded by "a" or "an" does not, without more constraints, preclude the existence of additional identical elements.

The following terms are used herein:

The term "amorphous propylene-co-hexene-1 polymer component" can include long chains of propylene and hexene-1 assembled together in a random order which inhibits the formation of crystalline structures or order.

The term "co-adjuvant" can refer to additives such as hydrogenated C5 tackifiers or plasticizers such as naphthenic oils The term "hot melt adhesive formulation" can refer to a thermoplastic material that is blended, or formulated, with other materials to make a formulation with a broader use of application spectrum.

The term "hexene-1 co-monomer" refers to one of eighteen hexene isomers.

The term "butene-1 co-monomer" refers to one of four butene isomers.

The term "propylene co-monomer" refers to an ethylene molecule with one methyl group in any one of the two unsaturated carbon atoms in ethylene. This would make propylene the simplest alpha olefin molecule.

The present disclosure is directed to processes for the purification of amorphous polymers, such as poly alpha olefins, from crude or reaction product mixtures which may contain one or more of the following: organoleptic species; volatile organic species such as unreacted monomers, alkanes, alkenes, oligomers, or acids; or electron donor compounds, co-catalysts, or other starting materials or by-products of a polymer synthesis procedure. Purification processes in accordance with various aspects of the present disclosure produce purified amorphous polymers having a very low or non-detectable odor; purified amorphous polymers having a volatile organic species content of less than about 5 percent by weight, preferably less than about 1 percent by weight, more preferably less than about 0.5 percent by weight, and most preferably less than about 0.1 percent by weight; and purified amorphous polymers having a pH ranging from about 5 to about 9, preferably a pH ranging from about 6 to about 8, and more preferably a pH ranging from about 6.5 to about 7.5.

Amorphous poly-alpha-olefins (APAO) are produced by the (co-)polymerization of α-olefins, e.g. ethylene (CAS #74-85-1), propylene (CAS #115-07-1), butene-1 (CAS #106-98-9) or hexene-1 (CAS #592-41-6), with Ziegler-Natta catalysts. The (co-)polymers have an amorphous structure which makes them useful for the production of hot melt adhesives.

In some instances, purified amorphous polymers, such as poly alpha olefins, can be obtained from crude or reaction product mixtures as follows. First, a crude or reaction product mixture containing an amorphous polymer ("unpurified amorphous polymer") is heated to form a molten unpurified amorphous polymer. The molten unpurified amorphous polymer is then formed into a stream. Water, steam, an inert gas, or any combination thereof is then injected into the molten unpurified amorphous polymer stream. The water, steam, inert gas, or any combination thereof and the molten unpurified amorphous polymer are then mixed to form a mixture. The mixture is then passed through a thin film evaporator assembly. In the thin film evaporator assembly, the steam, water, inert gas, or combination thereof strips organoleptic species, volatile organic species, acids, and/or other impurities trapped in the molten APAO therefrom. After removal of the stripped organoleptic species, acids, and/or other impurities and of the steam, water, inert gas, or combination thereof, a purified amorphous polymer is obtained. In some instances, the thin film evaporator assembly is a single thin film evaporator. In other instances, the thin film evaporator assembly is a series of multiple thin film evaporators. In some instances, the thin film evaporator assembly is vacuum enhanced. In some instances, the thin film evaporator assembly is continuously or substantially continuously wiped.

In some instances, the mixture is passed through a static mixer prior to entering the thin film evaporator assembly. In other instances, the mixture is passed through a series of static mixers prior to entering the thin film evaporator assembly.

In other instances, purified amorphous polymers, such as poly alpha olefins, can be obtained from crude or reaction product mixtures as follows. First, a crude or reaction product mixture containing an amorphous polymer ("unpurified amorphous polymer") is heated to form a molten unpurified amorphous polymer. The molten unpurified amorphous polymer is then formed into a stream. Water, steam, an inert gas, or any combination thereof is then injected into the molten unpurified amorphous polymer stream. The water, steam, inert gas, or any combination thereof and the molten unpurified amorphous polymer are then mixed to form a mixture. The mixture is then passed through an extruder. In the extruder, the steam, water, inert gas, or combination thereof strips organoleptic species, volatile organic species, acids, and/or other impurities trapped in the molten APAO therefrom. After removal of the stripped organoleptic species, acids, and/or other impurities and the steam, water, inert gas, or combination thereof, a purified amorphous polymer is obtained. In some instances, the extruder is vented. In some instances, the extruder is a screw extruder. In some instances, the screw extruder contains a single screw. In other instances, the screw extruder contains multiple screws.

In some instances, the mixture is passed through a static mixer prior to entering the extruder. In other instances, the mixture is passed through a series of static mixers prior to entering the extruder.

In yet other instances, purified amorphous polymers, such as poly alpha olefins, can be obtained from crude or reaction product mixtures as follows. First, a crude or reaction product mixture containing an amorphous polymer ("unpurified amorphous polymer") is heated to form a molten unpurified amorphous polymer. The molten unpurified amorphous polymer is then formed into a stream. Water, steam, an inert gas, or any combination thereof is then injected into the molten unpurified amorphous polymer stream. The water, steam, inert gas, or any combination thereof and the molten unpurified amorphous polymer are then mixed to form a mixture. The mixture is then passed through a thin film evaporator assembly and an extruder. In some instances, the mixture is first passed through a thin film evaporator assembly and then passed through the extruder. In other instances, the mixture is first passed through an extruder then passed through the thin film evaporator assembly. In the thin film evaporator assembly and the extruder, the steam, water, inert gas, or combination thereof strips organoleptic species, volatile organic species, acids, and/or other impurities trapped in the molten APAO therefrom. After removal of the stripped organoleptic species, acids, and/or other impurities and the steam, water, inert gas, or combination thereof, a purified amorphous polymer is obtained. In some instances, the thin film evaporator assembly is a single thin film evaporator. In other instances, the thin film evaporator assembly is a series of multiple thin film evaporators. In some instances, the thin film evaporator assembly is vacuum enhanced. In some instances, the thin film evaporator assembly is continuously or substantially continuously wiped. In some instances, the extruder is vented. In some instances, the extruder is a screw extruder. In some instances, the screw extruder contains a single screw. In other instances, the screw extruder contains multiple screws.

In some instances, the mixture is passed through a static mixer prior to entering the thin film evaporator assembly or extruder (dependent upon order of components). In other instances, the mixture is passed through a series of static mixers prior to entering the thin film evaporator assembly or extruder.

In accordance with various aspects of the present disclosure, organoleptic species, volatile organic compounds and acids that are removed can comprise one or more of the following: alkanes, alkenes, oligomers, volatile residues from a catalyst or a co-catalyst, and acid groups from chloride compounds.

In accordance with various aspects of the present disclosure, the inert gas can be nitrogen.

In accordance with various aspects of the present disclosure, the inert gas can be injected into the molten unpurified amorphous polymer stream, in either a liquid or gaseous state.

In accordance with various aspects of the present disclosure, the produced purified amorphous polymers, such as purified poly alpha olefins, can be alone or in combination with other compounds as an HMA composition. HMA compositions, in accordance with various aspects of the present disclosure, can comprise about 10 to about 100 percent by weight purified amorphous polymers and from about 0 to about 90 percent by weight of a combination of one or more of the co-adjuvants selected from the group of plasticizers, tackifiers, polyethylene waxes, polypropylene waxes, maleated polypropylene, maleated polyethylene, maleated polyethylene waxes, maleated polypropylene waxes and compatible polyethylenes, polypropylenes, styrene block co-polymers, ethylene vinyl acetate, and poly olefin copolymers.

HMA compositions according to the present disclosure can be used in various sectors of industry to permanently or temporarily join or adhere two or more similar or dissimilar materials to each other. In some instances, the HMA compositions disclosed herein can be used to permanently or temporarily join or adhere a joint or space between two or more similar or dissimilar materials to form a seal HMA compositions disclosed may also be used to sealingly join segments of square or other shaped frames by applying an amount of an HMA composition between the joints of each frame segment.

In some instances, hot melt adhesive formulations according to the present disclosure can further include one or more of a tackifier, an oil, a wax, a functionalized or non-functionalized polymer, an anti-oxidant, and a mineral. In some instances, hot melt adhesive formulations according to the present disclosure can comprise about 1 to about 90 weight percent of a combination of one or more of the co-adjuvants, wherein the co-adjuvant is selected from the group of plasticizers, tackifiers, polyethylene waxes, polypropylene waxes, maleated polypropylene, maleated polyethylene, maleated polyethylene waxes, maleated polypropylene waxes and compatible polyethylenes, polypropylenes, metallocene polyethylenes, metallocene polypropylenes, styrene block co-polymers, ethylene vinyl acetate and polyolefin copolymers.

Although the present invention and its objects, features, and advantages have been described in detail, other embodiments are encompassed by the invention. Finally, those skilled in the art should appreciate that they can readily use the disclosed conception and specific embodiments as a basis fir designing or modifying other structures for carrying out the same purposes of the present invention without departing from the scope of the invention as defined by the appended claims.

Example 1

A process for producing reduced unreacted butene-1 monomer in propylene-co-butene-1 APAO to reduce odor of an HMA.

The process involves introducing molten propylene-co-butene-1 APAO at a temperature of 375 degrees Fahrenheit having a flow rate of 1000 pounds per hour The molten APAO is flowed through a 2-inch diameter pipe.

The pipe is heated with a steam jacket.

The pipe is insulated with a jacket while injecting 1 wt % of a stripping agent based on the total weight of the contents of the jacketed pipe. Water can be used as the stripping agent. Deionized water can also be used.

In embodiments, steam can be condensed and then reinjected as distilled water. It is undesirable to use tap water with a high mineral content.

The stripping agent is introduced into the molten APAO in the jacketed pipe.

The stripping agent is based on the total weight of the contents of the jacketed pipe at a temperature above the softening point of the molten APAO in the jacketed pipe, which in this example is 375 degrees Fahrenheit.

In this example, the stripping agent is maintained with the molten APAO stream for two minutes forming a flowable heated mixture at 350 degrees Fahrenheit in the heated and jacketed pipe.

As the next step, the flowing heated mixture is kept at 350 degrees Fahrenheit and then flowed through a thin film evaporator such as those made by Luwa of LCI Corporation of Charlotte, N.C.

The thin film evaporator strips unreacted butene-1 from the flowing heated propylene-co-butene-1 APAO mixture and removes and recovers condensable hydrocarbon fractions typically in the range of diesel fuel and a non-condensable gas of saturated hydrocarbons including butane while simultaneously forming a 90% odor-reduced, cleaned molten APAO-based HMA.

Example 2

A process for producing reduced unreacted monomer of hexene-1 and butene-1 for propylene-co-butene-1-co-hexene-1 APAO to reduce odor of a hot melt adhesive.

The process involves introducing molten propylene-co-butene-1-co-hexene-1 APAO at a temperature of 350 degrees Fahrenheit having a flow rate of 3,000 pounds per hour.

The molten APAO is flowed through a 3-inch diameter pipe.

The pipe is heated with steam. Electric heaters are avoided to provide a safer working environment.

The pipe is insulated with a jacket while injecting with 10 wt % of a stripping agent based on the total weight of the contents of the jacketed pipe. Steam can be used as the stripping agent. Deionized water can be heated to be used as the steam.

The stripping agent is introduced into the molten APAO an the jacketed pipe.

The stripping agent is based on the total weight of the contents of the jacketed pipe at a temperature above the softening point of the molten APAO in the jacketed pipe, which in this example is 350 degrees Fahrenheit.

In this example, the stripping agent is maintained with the molten APAO stream for five minutes forming a flowable heated mixture at 330 degrees Fahrenheit in the heated and jacketed pipe forming a flowing heated mixture.

As the next step, the flowing heated mixture is kept at 330 degrees Fahrenheit and then flowed through a thin film evaporator such as those made by Luwa of LCI Corporation of Charlotte, N.C.

The thin film evaporator strips unreacted butene-1 and hexene-1 from the flowing heated propylene-co-butene-1-co-hexene-1 APAO mixture and removes and recovers condensable hydrocarbon fractions typically in the range of diesel fuel and gasoline and a non-condensable gas of saturated hydrocarbons including butane and hexane, while simultaneously forming an 80% odor-reduced, cleaned molten APAO-based HMA.

Example 3

A process for producing reduced unreacted monomer of propylene for the propylene-co-ethylene APAO.

The process involves introducing molten propylene-co-ethylene APAO into heated and insulated jacketed pipe at a temperature of 400 degrees Fahrenheit.

The molten APAO is flowed into a static mixer known as a KENICS® static mixer manufactured at National Oilwell Varco, L.P., located in Dayton, Ohio.

APAO is injected into the static mixer with molten of 5 wt % of a stripping agent based on the total weight of the contents of the jacketed pipe.

The stripping agent can be nitrogen, and the nitrogen is introduced at a temperature above the softening point of the molten APAO of 400 degrees Fahrenheit.

The stripping agent is mixed with the molten APAO in a continuous flow process having a residence time in the mixer of one minute forming a flowable heated mixture at 395 degrees Fahrenheit.

The flowing heated mixture is passed to the thin film evaporator assembly stripping propylene and other volatile organic components from the flowing heated mixture and removing and recovering condensable hydrocarbon fractions typically in the range of diesel fuel and gasoline and a non-condensable gas of saturated hydrocarbons while simultaneously forming an 85% odor-reduced, cleaned propylene-co-ethylene APAO-based HMA.

While these embodiments have been described with emphasis on the embodiments, it should be understood that within the scope of the appended claims, the embodiments might be practiced other than as specifically described herein.

What is claimed is:

1. A process for reducing organoleptic and acidic species, including unreacted monomers and condensable and non-condensable hydrocarbon fractions, in amorphous poly alpha olefin (APAO) comprising:
   a. introducing a molten mixture of amorphous poly alpha olefin into a heated and insulated jacketed pipe while injecting into the jacketed pipe from 0.1 wt % to 10 wt % of a stripping agent based on the total weight of the contents of the jacketed pipe at a temperature above the softening point of the molten amorphous poly alpha olefin, wherein the stripping agent is selected from the following group: liquid water, steam, and an inert gas;
   b. maintaining the stripping agent with the molten amorphous polyalpha olefin from ten seconds to ten minutes at 250 degrees Fahrenheit to 450 degrees Fahrenheit in the heated and insulated jacketed pipe forming a flowing heated mixture; and
   c. passing the flowing heated mixture through a thin film evaporator assembly, while maintaining the temperature of the flowing heated mixture and stripping organoleptic species and acids and volatile organic components from the flowing heated mixture, removing and recovering condensable hydrocarbon fractions of diesel fuel, and evolving a non-condensable gas of stripping agent and odor causing monomer while simultaneously forming a 10% to 90% odor-reduced cleaned molten amorphous poly alpha olefin based hot melt adhesives.

2. The process of claim 1, wherein the amorphous poly alpha olefin include amorphous propylene, amorphous propylene/ethylene, amorphous propylene/butene-1, amorphous propylene/hexene-1 copolymers, and amorphous propylene/ethylene/butene-1 and amorphous propylene/butene-1/hexene-1 terpolymers.

3. The process of claim 1, comprising using a static mixer providing mixing prior to passing the heated mixture into the thin film evaporator.

4. The process of claim 1, comprising using a single or twin screw extruder providing mixing for forming an increased homogenous mixture prior to passing the heated mixture into the thin film evaporator.

5. The process of claim 1, wherein the APAO is a terpolymer selected from the group consisting of: hexene-1, propylene, ethylene, and butene-1.

6. The process of claim 1, wherein the APAO is or a copolymer selected from the group consisting of: hexene-1, propylene, ethylene, and butene-1.

7. The process of claim 1, further comprising adding 0.1 wt % and 40 wt % of a co-adjuvant based on the final weight percent of the resultant hot melt adhesive to the polymer fix forming a hot melt adhesive, then stripping the combination of polymer with co-adjuvant as the mixture is introduced to a mixing device, resulting in a 10% to 90% reduction of odor of the resultant hot melt adhesive.

8. The process of claim 1, wherein the stripped acid, volatile organic compounds, and organoleptic species that are removed consisting of one or more of the following selected from the group of: alkanes, alkenes, oligomers, volatile residues from a co-catalyst, and acids from chloride compounds.

9. The process of claim 1, wherein the inert gas is nitrogen.

10. The process of claim 1, wherein molten material flows through the jacketed pipe at a rate of 500 to 10,000 pounds per hour.

* * * * *